J. H. MORTON.
APPARATUS FOR DRYING VEGETABLES AND OTHER SUBSTANCES OR MATERIALS.
APPLICATION FILED AUG. 11, 1919.
1,319,605.
Patented Oct. 21, 1919.
4 SHEETS—SHEET 1.
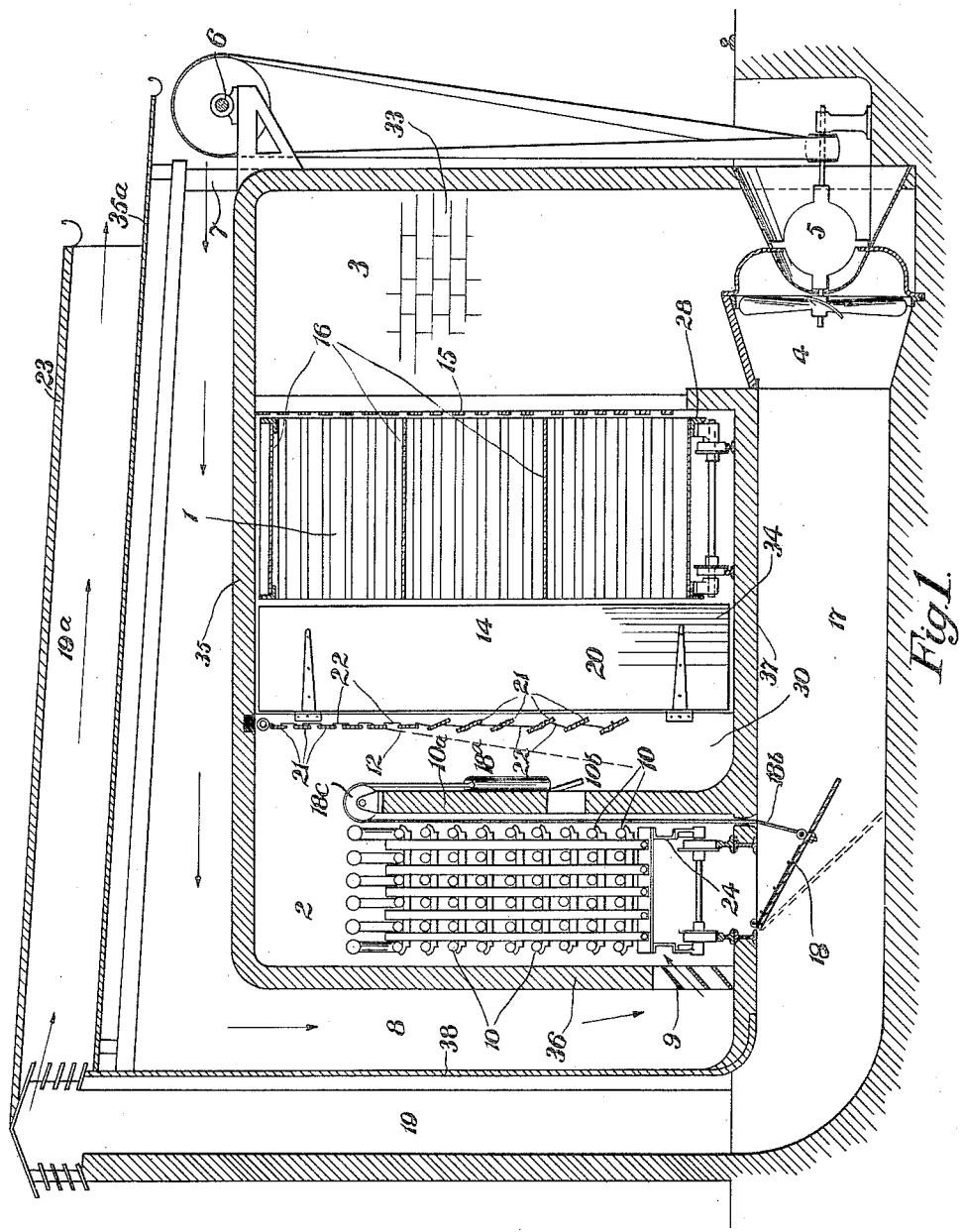

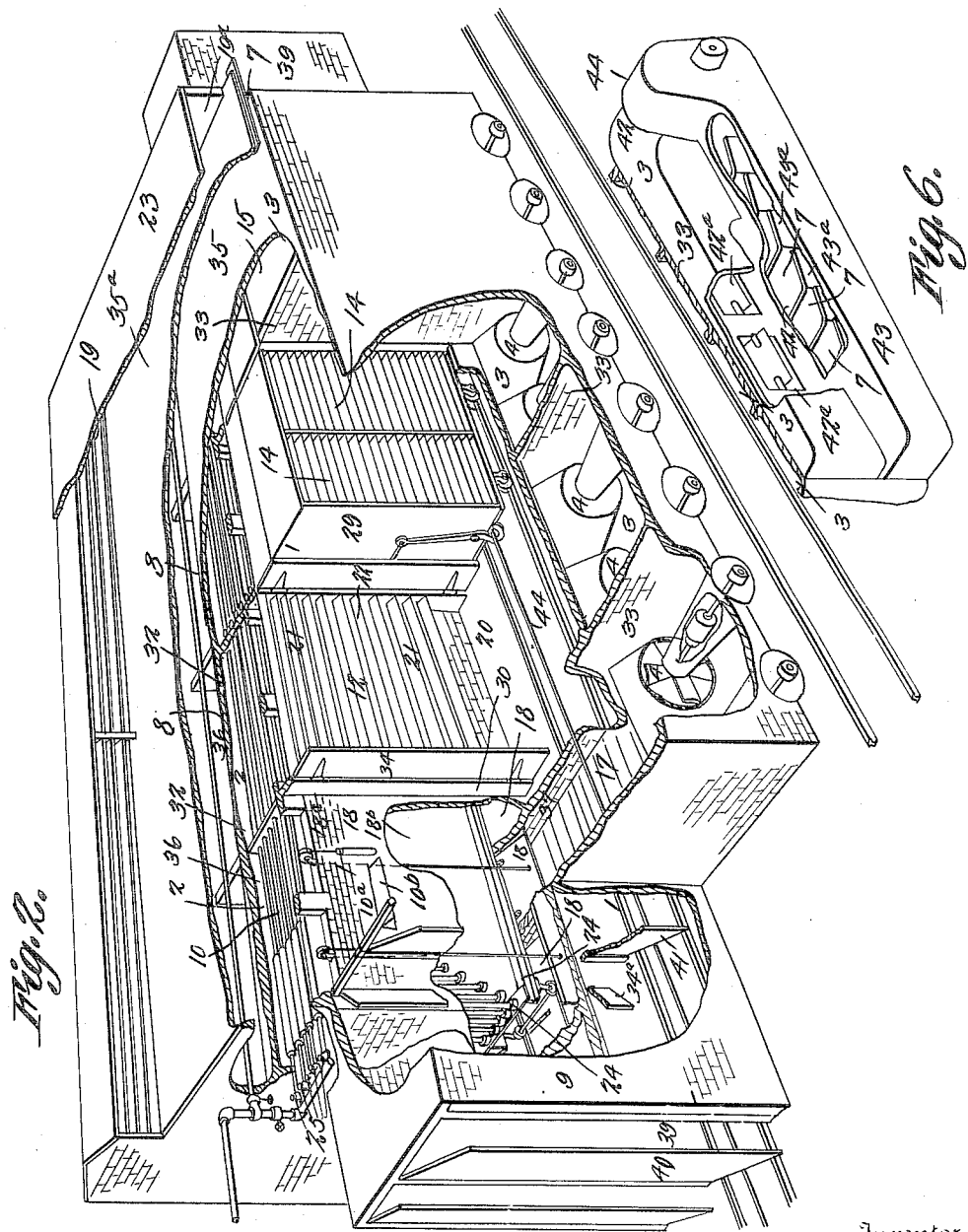

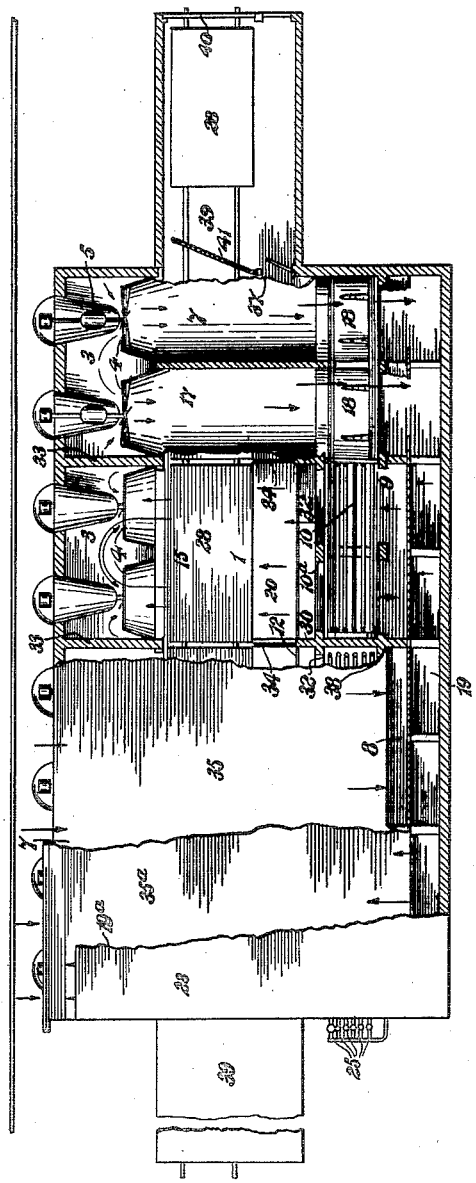

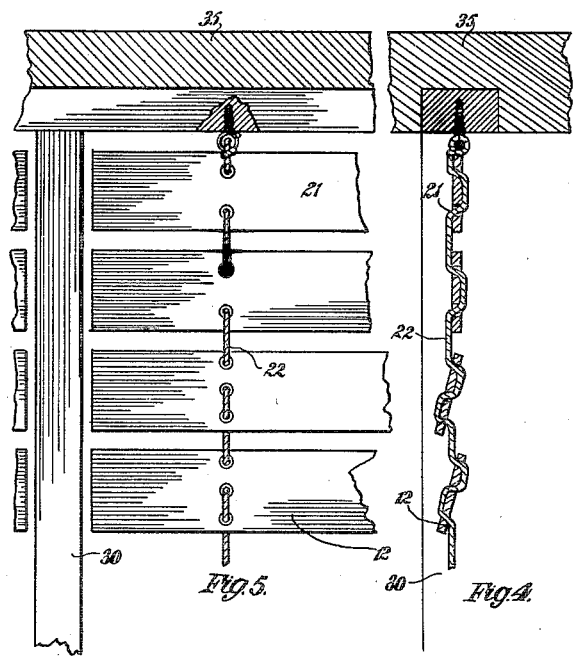

UNITED STATES PATENT OFFICE.

JOHN HENRY MORTON, OF LONDON, ENGLAND.

APPARATUS FOR DRYING VEGETABLES AND OTHER SUBSTANCES OR MATERIALS.

1,319,605.    Specification of Letters Patent.    Patented Oct. 21, 1919.

Application filed August 11, 1919. Serial No. 316,816.

*To all whom it may concern:*

Be it known that I, JOHN HENRY MORTON, a subject of the King of Great Britain and Ireland, residing at London, England, have invented certain new and useful Improvements in Apparatus for Drying Vegetables and other Substances or Materials, of which the following is a specification.

This invention relates to apparatus for treating vegetables and other substances or materials, and has reference to apparatus of that general character where the material to be dried is arranged upon trays or the like and passed through a drying chamber or tunnel.

The object of the present invention is to provide an improved apparatus by means of which such materials as potatoes, fruit and the like for instance, can be treated so as to be evenly dried throughout.

Drying apparatus of the kind contemplated by my invention usually involves a heating chamber and a suction chamber with the actual drying chamber or tunnel located between them. A difficulty which is experienced in operating such apparatus arises from the fact that the heated air tends to travel through the drying chamber along the path of least resistance and take a short circuit from the position at which it leaves the drying chamber. Thus the materials at one part of the drying chamber are dried too rapidly while those at another part are scarcely dried at all. The primary feature of my invention consists in the arrangement by which this is obviated and the air after passage vertically through the heating coils is constrained to take an even course in horizontal streams across the drying chamber from top to bottom. This involves an apparatus comprising a drying chamber located between a heating chamber and a suction chamber all of which are in substantially the same horizontal plane, means for admitting atmospheric air adjacent the bottom of the heating chamber, means for admitting said heated air adjacent the top of the drying chamber and means for distributing this air vertically downward and constraining it to pass substantially horizontally across the drying chamber in streams from top to bottom.

The means for effecting this distribution consists according to my invention of some form of vertical screen interposed between the heating coils and the drying chamber and preferably this screen is somewhat in the form of a Venetian blind having its slats capable of both positional and angular adjustments as hereinafter more specifically described. Although I prefer that the bulk of the air should pass up through the heating coils and then enter the drying chamber adjacent the top I may provide other controlled openings in the wall separating the heating and drying chambers for permitting a more finite regulation of the temperature conditions with the drier. Another important feature of my invention is the provision of improved means for regulating the humidity of the air delivered to the drying chamber. This means consists of an opening in the bottom of the heating chamber controlled by a damper or flap valve, these openings communicating with the delivery passage leading from the suction fan, and by the regulation of the dampers or valves the whole or any desired proportion of the humidified air withdrawn from the drying chamber can be returned to the heating chamber.

The path taken by the air will be best understood upon reference to the arrows shown in Figure 1 of the drawings.

By constructing the apparatus in sections it is possible according to my invention to vary the conditions of heat and humidity in any section of the drier as a whole and this possesses greater advantages in practice, when drying some materials, over apparatus where if any differences are provided for at all, these differences are necessarily according to a progressive sequence. That is to say, in the use of my plant the air in any section of the apparatus as a whole may be of any desired humidity and temperature without regard to the conditions prevailing in the other sections which can each be regulated as desired. A further feature of the invention consists of what may be termed the thermal system, the point of which is that the cold air entering the apparatus passes to the heating chamber in contact with the hot walls and roof of the drying and heating chamber and the hot exhaust from the fan passes in contact with the bottom or floor of these chambers. The particular construction and arrangement of the plant as a whole will be understood upon reference to the accompanying drawings wherein I have illustrated my invention, Fig. 1 being a transverse section of a drying apparatus constructed and arranged in accordance with my invention.

Fig. 2 is a perspective view with parts removed for clearness of illustration.

Fig. 3 is a part sectional plan view of the apparatus with parts removed to better show the interior.

Fig. 4 is a sectional elevation to an enlarged scale of the preferred form of my adjustable screen.

Fig. 5 is an elevational view thereof, and

Fig. 6 is a perspective view illustrating a modified method of supplying air.

Referring to these drawings and particularly to Figs. 1–5 the numeral 1 designates a drying chamber located between a heating chamber 2 and a suction chamber 3. The suction chamber 3 is preferably divided into sections each of which is provided with a suction fan or fans 4, and these suction fans may be driven conveniently by electric motors 5 located outside the influence of the heated air or alternatively these fans may be driven from a common shaft 6 through belt or other gearing in well known manner as indicated in Fig. 1. These suction fans 4 operate to induce the flow of air from the atmosphere through the air heating chamber 2 and thence across the drying chamber 1, and means are preferably provided as will hereinafter appear whereby varying quantities of the exhaust from the fans—which of course contains the moisture extracted from the material to be dried—can be returned to the heating chamber so that the humidity of the air in the drying chamber can be finitely regulated. The air induced by the fans 4 aforesaid is caused to pass from the inlet opening 7 running the whole length of the apparatus over the top of the drying and heating chambers and down a duct or passage 8 immediatey adjacent the heating chamber 2 so that it extracts heat from these walls prior to its entry into the heating chamber. The air is drawn in at the opening or openings 9 at the lower end of the heating chamber and passes upward through the heating coils 10 and then enters at the top of the drying chamber 1 over the top of a wall or partition $10^a$ which separates the heating chamber 2 from the drying chamber 1. In some cases openings $10^b$ controlled by suitable doors or closing flaps may be provided in the wall or partition $10^a$ so that air can be caused to enter the drying chamber at various positions through the wall or partition $10^a$. The air is then drawn through the controlling and mixing screen 12 which distributes it evenly and transversely over the drying trays 14 whence it passes to the suction chamber 3 which it enters through openings in the partition 15, which however may in some cases be omitted, and the area and proportions of these openings to each other and relative to the capacity of the fan or fans employed may be adjusted to be such as to insure the pressure in the heating chamber 2 being sufficiently above that in the suction chamber 3 as to cause a steady and even flow. Moreover certain of the drying trays which are in general perforated or of mesh form may be made solid or partitions such as 16 may be inserted between each or some of the trays 14 to insure horizontal passage of the air across the materials to be dried. From the suction chamber 3 the air is discharged to a conduit or conduits 17 beneath the drying and heating chambers, and this conduit is provided with flap valves or deflectors 18 capable of being adjusted so as to permit some of this exhaust to pass back to the heating chamber and the rest to pass to exhaust, the quantities passing to the heating chamber and exhaust respectively depending upon the adjustment of the valve or valves aforesaid, and it will be appreciated that by completely closing the valve or valves 18 the whole of the exhaust may be discharged to atmosphere through the outlet passage 19 and in this event all the air delivered to the heating and drying chambers will be fresh air induced through the openings 7 and 9 as will hereafter more fully appear. If desirable I may provide a roof 23 of non-conducting material so that the air in its passage to exhaust passes from the passage 19 along a passage $19^a$ between the wall or roof $35^a$ and the non-conducting roof 23. The flap valves 18 may be adjusted conveniently by the raising and lowering of the counterbalance weights $18^a$ which are connected to them by flexible connections $18^b$ passing over pulleys $18^c$ as will be clear upon reference to Fig. 1 of the drawings. In order to prevent the heated air, which as aforesaid enters the drying chamber at the top, making a short circuit to the suction fans, I provide as aforesaid the depending screen 12 which operates to guide and mix the air in the desired quantities and direction across the drying trays, and this screen may be described as of Venetian blind construction, the position and angle of the slats of which can be adjusted and set. This screen hangs within a passage or corridor 20 in the drying chamber which is large enough to permit the passage of an attendant or inspector. A convenient form which this screen may take is illustrated particularly in Figs. 4 and 5. The screen consists in general of slats 21 threaded upon a flexible connection 22. The upper of these slats 21 may be provided with two openings for the flexible connection as shown and it will be seen that by this means these slats can be arranged at any desired distance apart and will be held in the adjusted position by frictional resistance with the flexible connection. The lower slats are, however, preferably threaded through three holes so as to provide for a tilting of the slats to a suitable angle as illustrated. The reason for this arrangement is that some of the air meeting the screen at the upper end will be deflected downward and its inertia will tend to cause it to move down vertically in which case an undue proportion of it might pass certain openings without passing through the slats. By giving certain of the slats different angles of inclination precisely the required quantity may be caused to take the desired passage to and across the material to be dried. The air heating apparatus may consist of coils of piping 10 carried upon a traveling carriage or carriages 24 and in the preferred form I provide two sets of coils each on its own carriage and each set of coils is divided into a number of sections each controlled by a valve 25 (see Figs. 2 and 3) so that any section can be cut off from the steam supply at will and thus the temperature of the drying air can be regulated and controlled. By mounting the coils 10 on carriages it is possible to withdraw them at any time for inspection and repair, and if each set extends approximately throughout half the length of the chamber one half can be withdrawn from one end of the apparatus and the other half from the other end. An important advantage of this arrangement is that I may by regulation of the valves insure any desired temperature differences throughout the drying chamber. That is to say, I may have the coils at one end of the drying chamber in their hottest condition and by regulation of the valves and the entire cutting out of sections in some cases reduce the temperature at other parts, for instance, the other end of the drying chamber. The drying trays 14 are carried upon carriages or wagons 28 and the ends 29 of these carriages are preferably walls which form partitions which in conjunction with partitions 30—which may be provided with doors 34—in the corridor or passage 20 before alluded to, divide the drying chamber into sections each of which may be subject to the operations of particular fan or fans and a particular coil temperature and air conditions. The heating chamber 2 and the suction chamber 3 may also be provided with partitions 32 and 33 respectively to complete the division of the apparatus as a whole into sections. The apparatus is to some extent regenerative in its action since the cold air entering at the opening 7 passes in close proximity to the wall or roof 35 of the drying and heating chambers and the side wall 36 and takes up the waste heat from them. Moreover this incoming air also tends to become heated by contact with the wall 38 which is preferably a metal wall and becomes heated by the passage of exhaust in contact with it as such exhaust passes through the passage 19. This exhaust in its heated condition passes in contact with the hot wall or floor 37 forming the bottom of the drying chamber and the roof of the conduit or conduits 17 and tends to approximate its temperature either giving up heat to the wall or absorbing heat from the wall according to which of the two is of higher temperature at the moment. The carriages or wagons carrying the drying trays are introduced into the drying chamber through what may be termed air locks 39—that is to say locks or chambers 39 having doors so arranged that the wagons or carriages can be run into the lock and the outer doors closed prior to the opening of the doors leading into the drying chamber so that no cold air can get into the drying chamber during the passage of the material to be dried into such drying chamber as will hereafter more fully appear.

The operation of the plant as a whole is as follows: It is to be assumed that the heating coils 10 are supplied continuously with steam or some other source of heat and that the fans 4 are also continuously driven. The operation of these fans withdraws air from the suction chamber 3 and as a consequence the pressure in this chamber falls below that in the heating chamber 2 and as a consequence air flows into the chamber 3 through the opening 8, this air being fresh air induced through the opening 7 and passing to the opening 9 by the passage 8. The fans 4 discharge air from the chamber 3 into the duct 17 and this air is humidified by reason of its having passed through the drying chamber 1 and extracting moisture from the material being dried. The humidity of the air delivered to the drying chamber will depend primarily upon the regulation of the dampers or flap valves 18. If great humidity is required the dampers or flap valves 18 will be fully open, in which case the whole of the exhaust from the suction chamber 3 will be delivered to the heating chamber 2 and theoretically no fresh air will be induced through the opening 9 into the heating chamber since there will be simply a circulation of the same air continuously. If, however, the dampers or flap valves 18 are fully closed all the humidified air exhausted from the suction chamber will be discharged through the passage 19 to atmosphere and fresh air will flow continuously through the opening 9 into the heating chamber since under these conditions a partial vacuum will occur in the heating chamber 2. It thus follows that the quantity of fresh air supplied can be finitely regulated and will be dependent upon the position of the dampers or flap valves 18. With these dampers or valves partially open—which will probably be usual in practice—some of humidified air in the chamber 3 will pass to the heating chamber 2 and part will flow to the passage 19 or to passages 19 and 19ª to atmosphere while some fresh air will pass from the inlet 7 by way of the passage 8 and opening 9 to the heating and drying chambers. It will be clear from an inspection of Fig. 1 of the drawings that incoming air will tend to become heated by its passage along the heated roof 35 and side wall 36 prior to its entry into the heating chamber 2, while conversely the hot exhaust from the chamber 3 will tend to give up its heat to the bottom or floor 37 of the apparatus. The regulation of the flow of air across the drying chamber 1 is effected by the screen 12 and screen like partition 15. That is to say, air coming into contact with a screen 12 passes through the opening between the slats 21 and by regulating the distance apart of the upper slats and the distance apart and angle of inclination of the lower ones an even distribution throughout that entire section can be effected. Moreover I propose to provide means whereby the screen 12 as a whole may be adjusted in position as will be seen from Fig. 1 where an alternative position is indicated in dotted lines. The partition screen 15 is somewhat similar to the screen 12 except that it is only necessary to provide means for adjusting the distance apart of the slats, it being unnecessary to provide for varying the inclination of any of them although if desirable means may be provided as described with reference to the screen 12.

It follows that by controlling the ingress of the air to the drying chamber 1 by means of the screen 12 and its egress from the drying chamber by means of the partition screen 15 the air will be constrained to take a horizontal course evenly across the chamber in which the material to be dried is arranged. In order to further insure this horizontal flow of the air some of the trays—which are in general perforated—may be arranged without perforations, or partitions 16 may be arranged at intervals as before described.

The material to be dried may be introduced into the drying chamber upon trucks or wagons 28 adapted to run upon rails and in order to prevent cold air from the outside entering the drying chamber during the periods of transition I provide air locks 39 at the ends of the chamber. When it is desired to effect this transit from the outside to the inside of the chamber the inner door 41 is shut until the truck or wagon has been introduced into the lock. The outer door 40 is then shut and the inner one opened while the wagon is transferred into the drying chamber. Obviously the removal of the dried material from the chambers involves a reverse operation of the doors. It should be mentioned that in the particular embodiment of my invention hereinbefore described and illustrated in the drawings each section of the apparatus is described and shown as subject to the influence of its own fan or fans but it will be appreciated that air may be supplied from a common source to a single duct from which branches lead to the various sections and further the exhaust from each section may pass to a common suction duct or chamber. Such an arrangement is illustrated diagrammatically in Fig. 6 wherein the numeral 42 designates a common suction pipe or passage leading to the suction side of a fan 44 which delivers to a common pipe 43. The passages leading from the various sections of the apparatus to the common suction pipe 42 may be controlled by adjustable dampers 42ª and similarly the air delivered by the fan may be returned to various sections under the control of dampers 43ª controlling the entrance to various parts of the apparatus or may pass to the exhaust passage 19 as will be clearly understood upon reference to Fig. 6 of the drawings.

What I claim and desire to secure by Letters Patent is:—

1. In apparatus for treatment of vegetables and other materials, including a heating chamber and a suction chamber, a drying chamber located between the heating chamber and suction chamber, said chambers being in substantially the same horizontal plane, means for admitting atmospheric air adjacent the bottom of the heating chamber, means for admitting said air after passage through the heating chamber adjacent the top of the drying chamber and an adjustable air controlling screen located between the heating chamber and the drying chamber.

2. Apparatus for the treatment of vegetables and other materials as set forth in claim 1 and having a second openwork screen located between the drying chamber and the suction chamber.

3. Apparatus for the treatment of vegetables and other materials as set forth in claim 2 wherein the air controlling screen consists of slats adjustable in position relative one to the other.

4. Apparatus for the treatment of vegetables and other materials as set forth in claim 2 wherein a predetermined number of the slats of the air controlling screen are also capable of having their angle of inclination adjusted.

5. Apparatus for the treatment of vegetables and other materials as set forth in claim 1, having air locks at each end of the drying chamber substantially as and for the purpose specified.

6. Apparatus for the treatment of vegetables and other materials as set forth in claim 1, wherein the heating chamber is in communication through damper controlled openings with the delivery side of the suction apparatus withdrawing air from the suction chamber whereby some or all of the humidified air withdrawn from the apparatus can be returned to the heating chamber substantially as and for the purpose specified.

7. Apparatus for the treatment of vegetables and other materials as set forth in claim 1, wherein the fresh cold air entering the apparatus passes to the heating chamber in contact with the hot roof and walls of the drying and heating chambers and the hot exhaust air discharged by the suction apparatus passes in contact with the bottom or floor of the drying and heating chambers and in its passage to final exhaust passes in contact with the outer wall or walls of the inlet ducts or passages.

8. Apparatus for the treatment of vegetables and other materials as set forth in claim 1 wherein an admission valve controlled opening or openings is or are provided in the wall dividing the heating chamber from the drying chamber substantially as specified.

9. Apparatus for the treatment of vegetables and other materials as set forth in claim 1 wherein the apparatus as a whole is divided into sections in each of which conditions of heat and humidity can be regulated independently, substantially as specified and for the purpose specified.

Signed at London, England, this twenty-fifth day of June, 1919.

JOHN HENRY MORTON.